United States Patent
Schneberger

(10) Patent No.: US 9,988,257 B2
(45) Date of Patent: Jun. 5, 2018

(54) MANUAL DISPENSING VALVE

(71) Applicant: Prince Castle LLC, Carol Stream, IL (US)

(72) Inventor: David A. Schneberger, Brooklyn Park, MN (US)

(73) Assignee: Prince Castle LLC, Carol Stream, IL (US)

( * ) Notice: Subject to any disclaimer, the term of this patent is extended or adjusted under 35 U.S.C. 154(b) by 0 days. days.

(21) Appl. No.: 15/386,738

(22) Filed: Dec. 21, 2016

(65) Prior Publication Data
US 2017/0174497 A1    Jun. 22, 2017

Related U.S. Application Data

(60) Provisional application No. 62/270,111, filed on Dec. 21, 2015.

(51) Int. Cl.
| | |
|---|---|
| *B67D 3/00* | (2006.01) |
| *B67D 3/04* | (2006.01) |
| *B67D 7/80* | (2010.01) |
| *F16K 7/06* | (2006.01) |
| *F16K 7/04* | (2006.01) |
| *B67D 1/08* | (2006.01) |

(52) U.S. Cl.
CPC .............. *B67D 3/041* (2013.01); *F16K 7/063* (2013.01); *B67D 1/0857* (2013.01); *B67D 3/0009* (2013.01)

(58) Field of Classification Search
CPC .... B67D 3/041; B67D 3/0009; B67D 1/0857; F16K 7/063
See application file for complete search history.

(56) References Cited

U.S. PATENT DOCUMENTS

| | | | | |
|---|---|---|---|---|
| 2,775,374 | A | * | 12/1956 | Tamminga ............... B67D 3/02 222/108 |
| 2,806,482 | A | | 9/1957 | Norris et al. |
| 2,808,185 | A | | 10/1957 | Norris et al. |
| 2,876,937 | A | | 3/1959 | Wilson |
| 3,598,289 | A | * | 8/1971 | Norris ....................... B67B 7/30 222/80 |
| 3,881,641 | A | * | 5/1975 | Pliml, Jr. ............... A47G 19/18 222/207 |
| 4,651,898 | A | | 3/1987 | Bell |
| 4,801,050 | A | * | 1/1989 | Bell ....................... B67D 3/041 222/212 |
| 4,961,508 | A | * | 10/1990 | Weimer ............... B67D 1/0001 222/183 |

(Continued)

OTHER PUBLICATIONS

Pinch Valve Semantics, David Gardellin, President of Onyx Valve Co., available at www.onyxvalve.com, 2011.

(Continued)

*Primary Examiner* — Frederick C Nicolas
(74) *Attorney, Agent, or Firm* — Andrus Intellectual Property Law, LLP

(57) ABSTRACT

A pinch valve includes a valve block. A valve insert defines a tube chamber and is disposed within an open interior of the valve block. A valve gate includes a body. The valve gate body is movably engaged with the valve insert. The valve gate is at least partially disposed within the open interior of the valve block. A lever is pivotably connected to the valve insert. The lever includes a tube projection that is pivotably movable within the tube chamber.

20 Claims, 13 Drawing Sheets

(56) References Cited

U.S. PATENT DOCUMENTS

| | | |
|---|---|---|
| 5,114,045 A | 5/1992 | Herpe |
| 5,265,772 A | 11/1993 | Bartasevich et al. |
| 5,340,211 A | 8/1994 | Pratt |
| 5,797,519 A | 8/1998 | Schroeder et al. |
| 5,862,956 A | 1/1999 | Brandenburg et al. |
| 5,921,440 A | 7/1999 | Maines |
| 6,186,361 B1 | 2/2001 | Teetsel, III |
| 6,253,957 B1 | 7/2001 | Messerly et al. |
| 6,497,343 B1 | 12/2002 | Teetsel, III |
| 6,502,724 B1 | 1/2003 | Kelpach |
| 6,626,332 B2 | 9/2003 | Ehrensperger et al. |
| 6,659,311 B2 | 12/2003 | Prueter |
| 6,792,966 B2 | 9/2004 | Harvey |
| 7,337,920 B2 | 3/2008 | Duck et al. |
| 7,360,672 B2 | 4/2008 | Sweeton |
| 7,461,763 B1 | 12/2008 | Winn |
| 8,387,824 B2 | 3/2013 | Wietgrage |
| 8,636,176 B2 * | 1/2014 | Malin .................... B67D 3/041 222/146.6 |
| 2004/0031813 A1 | 2/2004 | Gates |
| 2007/0192981 A1 | 8/2007 | Lawshe |
| 2007/0267446 A1 | 11/2007 | Pressler |
| 2008/0302822 A1 | 12/2008 | Tetreault et al. |
| 2009/0250491 A1 | 10/2009 | Erman et al. |
| 2010/0065587 A1 | 3/2010 | Erman et al. |
| 2017/0122444 A1 * | 5/2017 | Wilson .................... B67D 7/36 |
| 2017/0122451 A1 * | 5/2017 | Wilson ................ B67D 1/0082 |

OTHER PUBLICATIONS

Silver King, Majestic Series Milk Dispenser, 2009.
Silver King, Model SKMCD1P, Equipment Manual for McDonald's, 2005.
Silver King, Portion Control Cream Dispensers, 2005.
Heinz Foodservice, The Heinz Guide to Condiment Dispensing Equipment, 2011.
Silver King, Cream Dispenser Technical Manual and Replacement Parts List Model SKNES2B/3B, 2011.

* cited by examiner

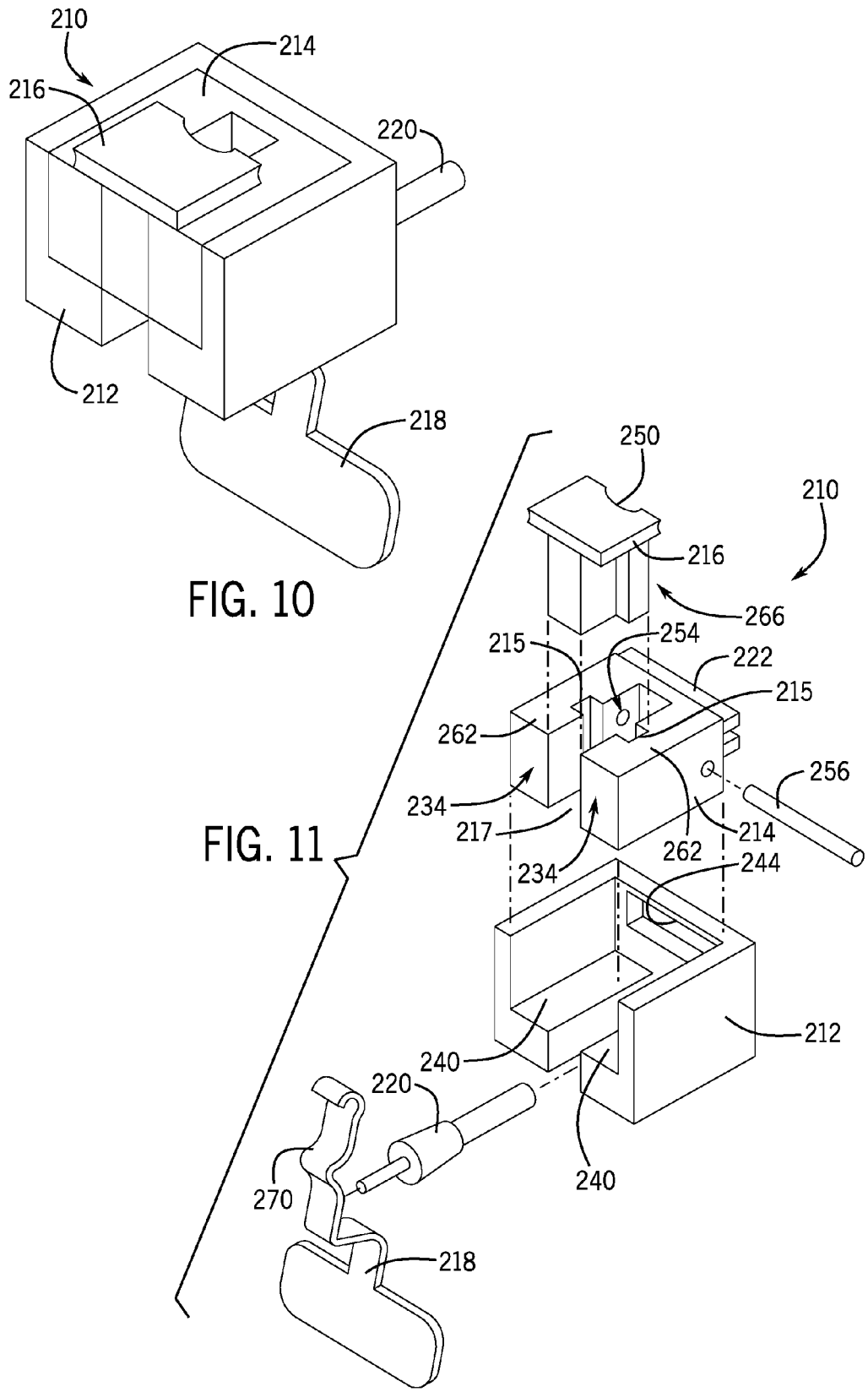

MANUAL DISPENSING VALVE

CROSS-REFERENCE TO RELATED APPLICATION

The present application claims priority of U.S. Provisional Patent Application No. 62/270,111, filed on Dec. 21, 2015, the content of which is hereby incorporated herein by reference in its entirety.

BACKGROUND

The present disclosure relates to the field of liquid dispensing. More specifically, the present application is related to a manually actuated pinch valve for dispensing a liquid through a flexible tube.

A pinch valve is a valve that is operable with a flexible tube and which is capable of pinching the tube to control a flow of fluid therethrough.

While pinch valves are popular in liquid dispensing devices, particularly beverage and liquid food dispensers, they require careful control of the cleanliness of the device. Device cleanliness can be facilitated in two ways. First, secure shut off of liquid flow at the end of dispense minimizes overrun and leakage through the valve during dispenses. Secondly, a system that is easy to clean facilitates and promotes both routine cleaning as well as efficiency of routine cleaning efforts. However, these two objectives are often opposed because ensuring secure closure of pinch valves can lead to increased complexity in the valve itself and the increased complexity makes the valve more difficult to clean. Therefore, a solution that provides improved valve closure while also improving and facilitating an ability to clean the device would be advantageous in the field.

BRIEF DISCLOSURE

An exemplary embodiment of a pinch valve includes a valve block with a plurality of walls that define an open interior. A valve insert includes a plurality of walls that define a tube chamber. The valve insert is disposed within the open interior of the valve block. A valve gate includes a body. The valve gate body is movably engaged with the valve insert. The valve gate is at least partially disposed within the open interior of the valve block. A lever is pivotably connected to the valve insert. The lever includes a tube projection that is pivotably movable within the tube chamber.

Another exemplary embodiment of a pinch valve further includes a heat sink insert, partially disposed through a wall of the plurality of walls of the valve block and extending exterior of the valve block. In an exemplary embodiment, the heat sink insert is held in thermally conductive engagement with the valve insert. In a further exemplary embodiment the valve insert includes a tube anvil opposed from the tube projection. In an exemplary embodiment of a pinch valve, the valve insert and the valve gate are held at least partially within the valve block by a friction fit between an interior of the valve block, the valve gate and the valve insert.

An exemplary embodiment of a liquid dispenser includes a cabinet. A pinch valve further includes a valve block with a plurality of walls that define an open interior. A valve insert includes a plurality of walls that define a tube chamber. The valve insert is disposed within the open interior of the valve block. A valve gate includes a body. The valve gate body is movably engaged with the valve insert. The valve gate is at least partially disposed within the open interior of the valve block. A lever is pivotably connected to the valve insert. The lever includes a tube projection that is pivotably movable within the tube chamber.

Another exemplary embodiment of a liquid dispenser further includes a heat sink insert partially disposed through a wall of the plurality of walls of the valve block and extending exterior of the valve block. The liquid dispenser further includes a refrigeration system that operates to cool the cabinet and a refrigerant line that extends from the refrigeration system and engages the heat sink insert. A still further exemplary embodiment of a liquid dispenser includes a container disposed within the cabinet and a flexible tube partially disposed within the cabinet and extending out of the cabinet and through the pinch valve. The liquid dispenser exemplarily includes a tube anvil and the lever operates between a closed position wherein the flexible tube is occluded between the tube projection and the tube anvil and an open position, wherein the tube projection is positioned away from the tube anvil and liquid is permitted to flow through the flexible tube.

A two-piece pinch valve is disclosed in U.S. Pat. No. 8,636,176. A first piece or part of the valve is fixedly installed into a dispensing cabinet. A second piece or part includes a movable pinch bar that pinches and un-pinches a tube is installable into and removable from the first piece by hand. Removal of the second piece from the first pieces allows a tube to be directly installed into the pinch valve. Installation of the second piece into the first piece configures the valve for operation. The second piece is installed into slots in the first piece. The slots and engaging protuberances on the second piece enable the second piece to be locked in place. U.S. Pat. No. 8,363,176 is hereby incorporated by reference in its entirety.

BRIEF DESCRIPTION OF THE DRAWINGS

FIG. 10 depicts an additional exemplary embodiment of a pinch valve.

FIG. 11 is an exploded view of the exemplary embodiment of a pinch valve depicted in FIG. 10.

DETAILED DISCLOSURE

Figure 1:
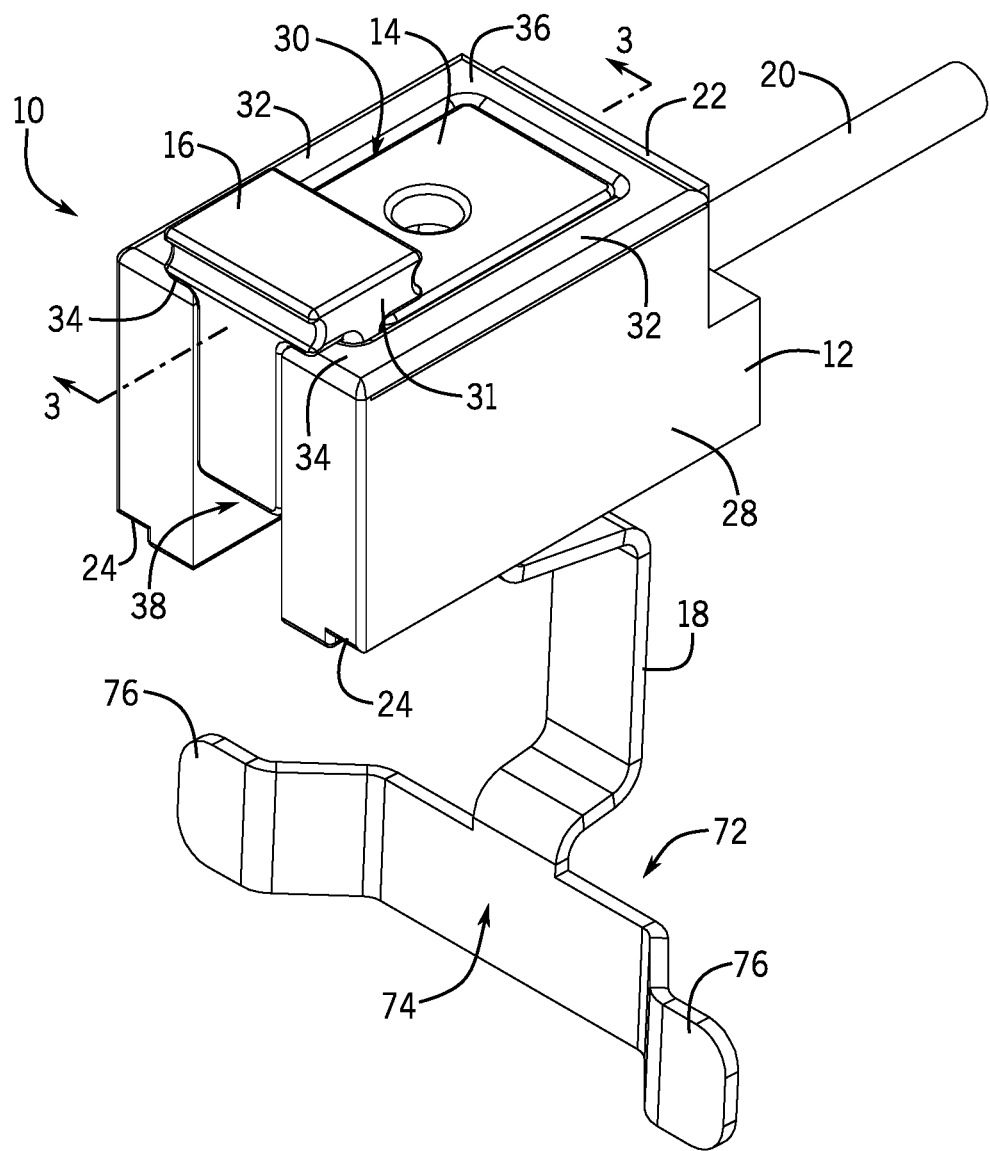
FIG. 1 is a perspective front view of an exemplary embodiment of a pinch valve.

FIG. 1 is a perspective view of an exemplary embodiment of a pinch valve 10. The pinch valve 10 includes a valve block 12, a valve insert 14, a valve gate 16, a lever 18, a pin plunger 20, and a heat sink insert 22. In an exemplary embodiment, the valve block 12 and the valve gate 16 are constructed of plastic, exemplarily, but not limited to high density polyethylene (HDPE). The valve insert 14, heat sink insert 22, pin plunger 20 and lever 18 are constructed of metal, exemplarily, but not limited to stainless steel or aluminum. However, it will be recognized that any of the components of the pinch valve 10 may be constructed of other materials as will be recognized by a person of ordinary skill in the art.

Figure 8:
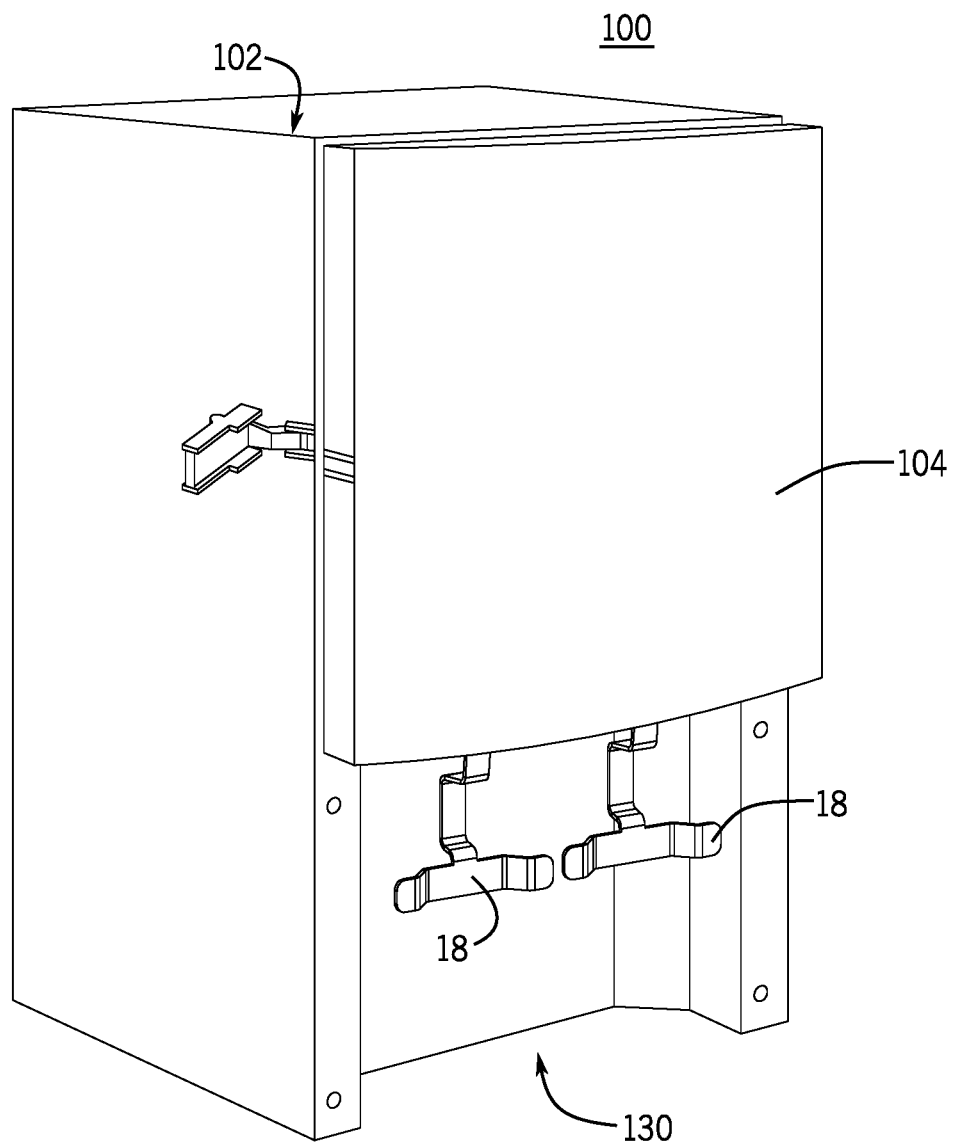
FIG. 8 is a perspective view of an exemplary embodiment of a liquid dispenser.
Figure 9:
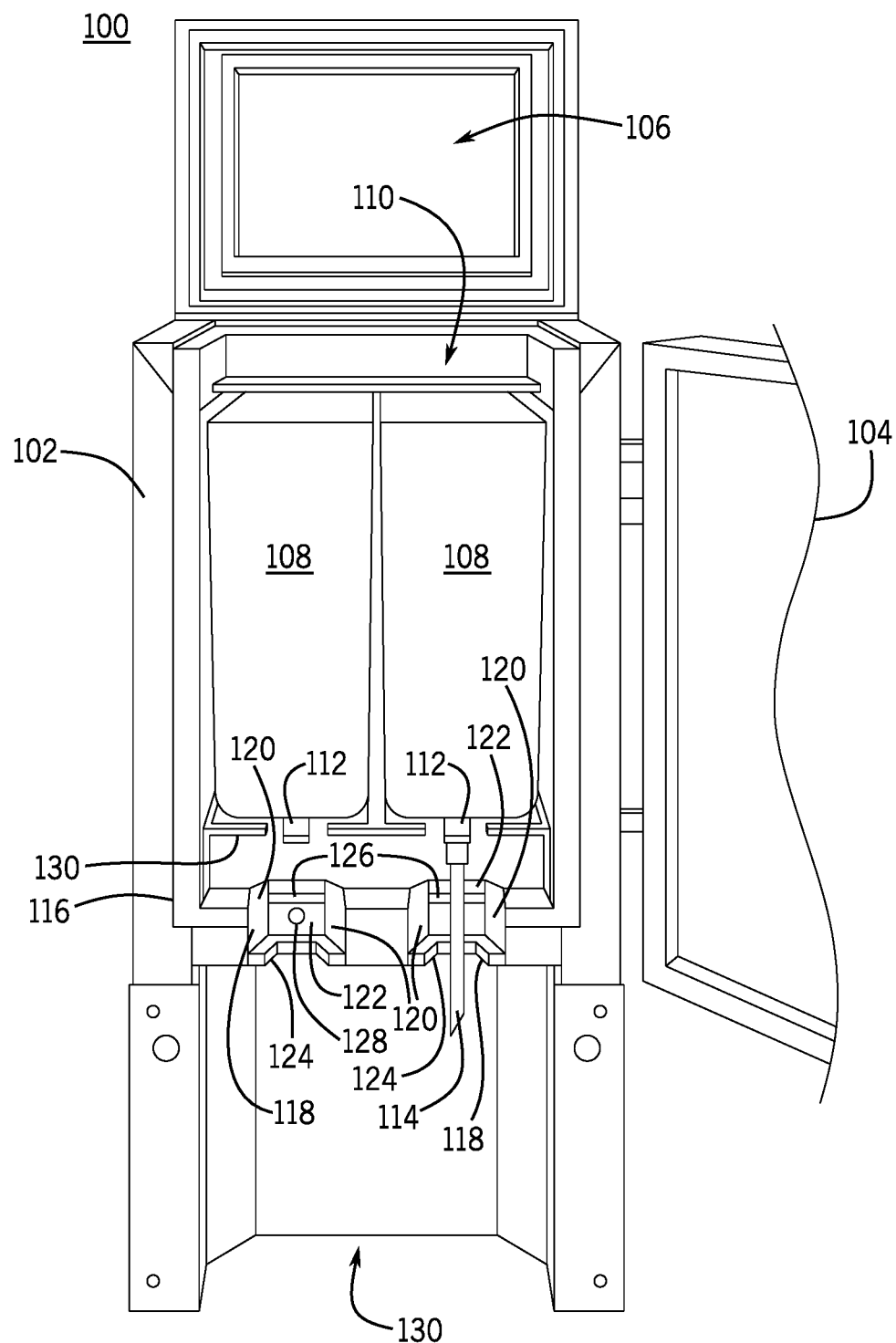
FIG. 9 is a front view of an exemplary embodiment of a liquid dispenser with the doors open.

Embodiments of the pinch valves as disclosed herein may exemplarily be used in a liquid dispenser 100 as depicted in FIGS. 8 and 9. Embodiments of the liquid dispenser 100 may be refrigerated and thus include a refrigeration system (not depicted) in order to control the temperature within the liquid dispenser 100. Embodiments of the liquid dispenser 100 include a cabinet 102 which includes a front door 104 which is exemplarily shown as closed in FIG. 8 and as opened (in partial view) in FIG. 9. The liquid dispenser 100 as depicted in FIG. 9 further includes a top door 106 which in embodiments facilitates replacement and filling of containers 108 filled with the liquid to be dispensed. The cabinet 102, along with the front door 104 and the top door 106 defines a compartment 110 that, as previously mentioned, may be temperature controlled and exemplarily refrigerated by a refrigeration system (not depicted) of the liquid dispenser 100.

The containers 108 are disposed within the compartment 110 and filled with a liquid to be dispensed. While the containers 108 depicted in FIG. 9 are that of rigid reusable containers, it will be recognized that in other embodiments, bags of liquid may be placed in rigid caddies and used as the containers 108 or boxes or boxed bags of liquid to be dispensed may be positioned within the compartment 110 as well to be used as containers 108. Independent of the form of the container 108, a nozzle 112 and a flexible tube 114 extend from the container 108. The liquid to be dispensed is dispensed through this nozzle 112 and flexible tube 114 as described in further detail herein. A shelf 130 may be disposed within the compartment 110. The container(s) 108 may be supported by the shelf 130 within the compartment 110, for example to position the containers 108 and nozzles 112 properly above the pinch valves (not depicted) described herein.

A bottom edge 116 of the compartment 110 includes at least one slot 118 which is configured to receive a pinch valve as described herein. In an embodiment, the compartment 110 is configured to hold two containers, as depicted in FIGS. 8 and 9. However, it will be recognized that in other embodiments the compartment 110 may be configured to hold any number of containers, including, but not limited to one or three containers. It will be recognized that a corresponding number of slots 118, each configured to receive a corresponding pinch valve, would be used in such embodiments.

The slot 118 includes opposed side walls 120, a rear wall 122, and a bottom lip 124. These features respectively engage components of the pinch valve as disclosed herein to secure the pinch valve to the liquid dispenser 100. FIG. 8 which depicts the liquid dispenser 100 with the front door 104 closed, further depicts the respective levers 18 of the pinch valves extending out from the cabinet 102 and front door 104 of the liquid dispenser 100 when the pinch valves are secured into the liquid dispenser.

The liquid dispenser 100 further includes refrigeration tubing 126, which may exemplarily be a copper tube connected to the refrigeration system (not depicted) and through which the refrigerant of the refrigeration system flows. The heat sink of the pinch valve as disclosed in further detail herein engages the refrigeration tubing 126. Heat is removed from the pinch valve through the heat sink and the refrigeration tubing 126 to exemplarily cool the heat sink and valve insert to maintain temperature control of the liquid to be dispensed remaining within the flexible tube 114. The refrigerant tube 126 exemplarily extends along the back of the slot 118. Also, embodiments of the slot 118 further include a plunger hole 128 which is adapted to accommodate the pin plunger as described in further detail herein.

Figure 2:
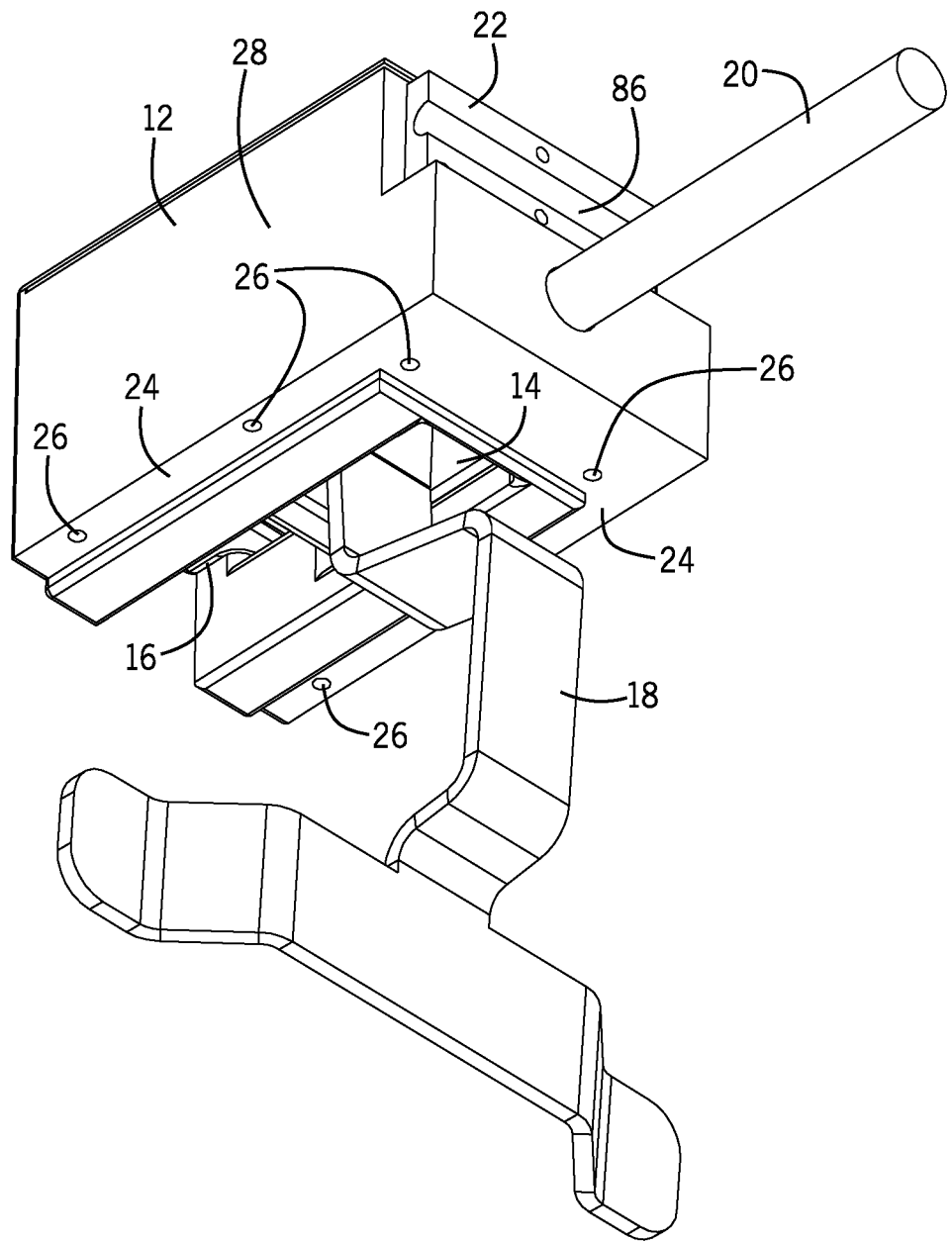
FIG. 2 is a perspective rear view of the exemplary embodiment of the pinch valve.

Referring back to FIGS. 1 and 2, the pinch valve 10 is exemplarily constructed with all of the components either inserted or partially inserted within the valve block 12. As described herein, once the pinch valve 10 is assembled, the valve block 12 engages the dispenser 100, particularly the slot 198 of the dispenser 100 (FIG. 9). The valve block 12 which is depicted in further detail in FIGS. 4, 5, and 14 includes a bottom ledge 24 which extends around the sides and rear of the valve block 12 as better seen in FIG. 2. In an embodiment, the bottom ledge 24 exemplarily extends into the valve block 12 from a bottom of the valve block. As also seen in FIG. 2, a series of screw holes 26 extend into the bottom ledge 24. These screw holes 26 facilitate a secure connection between the bottom lip 124 of the liquid dispenser 100 as depicted in FIG. 9 to the bottom ledge 24 of the valve block 12 of the pinch valve 10. It will be recognized that in exemplary embodiments, the bottom ledge 24 of the valve block 12 corresponds in shape to the bottom lip 124 of the liquid dispenser 100. Similarly, the valve block 12 may be dimensioned such that sides 28 of the valve block 12 slidingly engage the side walls 120 of the slot 118. In an exemplary embodiment, the valve block may be removably fixed to the dispenser 100, for example by screws extending through the bottom lip 124 and into the screw holes 26 of the valve block 12.

Figure 4:
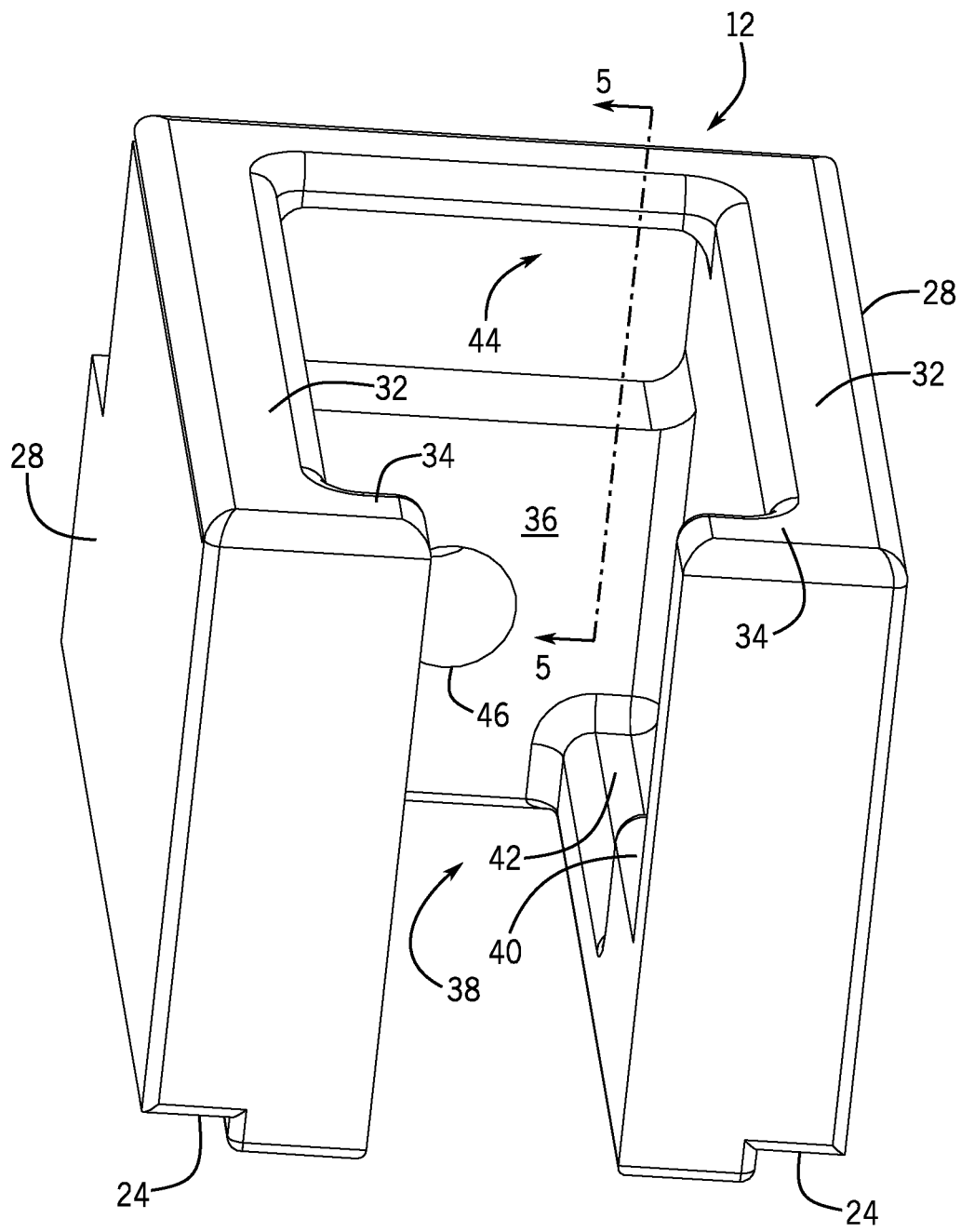
FIG. 4 is a front perspective view of an exemplary embodiment of a valve block.
Figure 5:
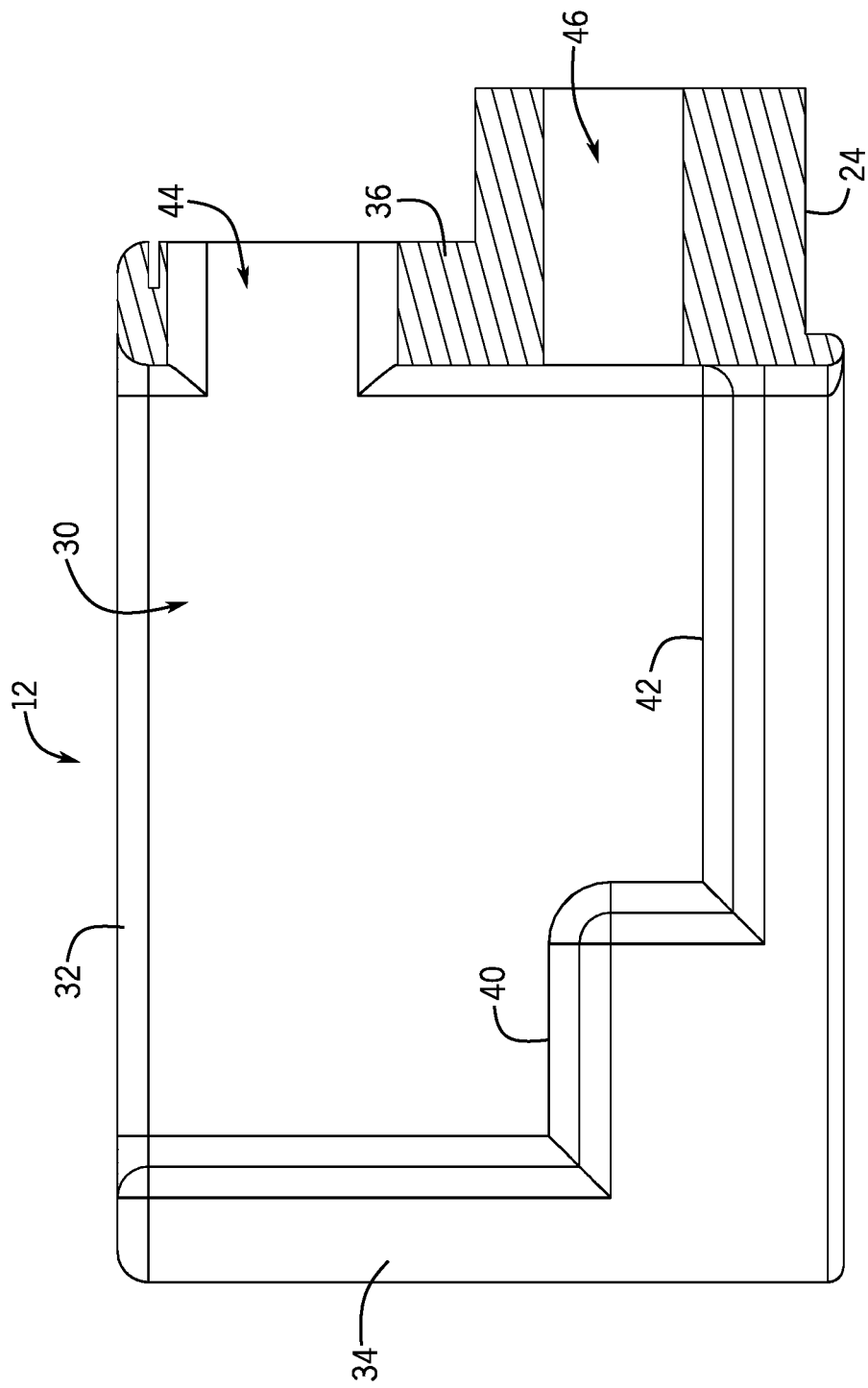
FIG. 5 is a side sectional view of the valve block as taken along line 5-5 of FIG. 4.

As best depicted in FIGS. 4 and 5, the valve block 12 defines an open interior 30 with side walls 32, front walls 34, and back wall 36. It will recognized that the front wall 34 may be considered to be a single front wall 34 through which a vertical slot 38 is defined, or that a respective front wall 34 extends inwardly from each of the respective side walls 32 thereby defining its vertical slot 38 therebetween. It will be recognized in another embodiment, no vertical slot may be present, and the front wall 34 may extend completely across the front of the valve block 12. However, embodiments of the valve block 12 that include a vertical slot 38 at least partially through the front wall 34, may facilitate removal of the valve gate 16 fro disassembly of the pinch valve 10 for example for cleaning or maintenance.

The open interior 30 defined inside the valve block 12 include at least one set of opposed ridges. In the embodiment depicted in FIGS. 2-5, for example, the valve block 12 includes two ridges that exemplarily extend inward from each of the opposing side walls 32. These two ridges include an upper ridge 40 and a lower ridge 42. As will be described in further detail herein. The valve gate 16 is exemplarily retained within the open interior 30 between the front walls 34 and a ridge (e.g. upper ridge 40) of the valve block 12. The valve insert 14 is retained within the open interior 30 between the back wall 36 and at least one set of opposed ridges (e.g. lower ridges 42 and upper ridges 40) of the valve block 12). The valve gate 16 further retains the valve insert 14 within the open interior 30 by a friction fit against the valve insert 14. In an embodiment, the valve gate 16 is held between the interior of the front wall 34 and the valve insert 14. The valve gate 16 presses the valve insert 16 against the interior of the back wall 36. A heat sink cut out 44 extends through the back wall 36 as well as a plunger hole 46. As described in further detail herein, the heat sink 22 is held in the heat sink cut out 44 in engagement with the valve insert 14 held again it by the valve gate 16.

Figure 3:
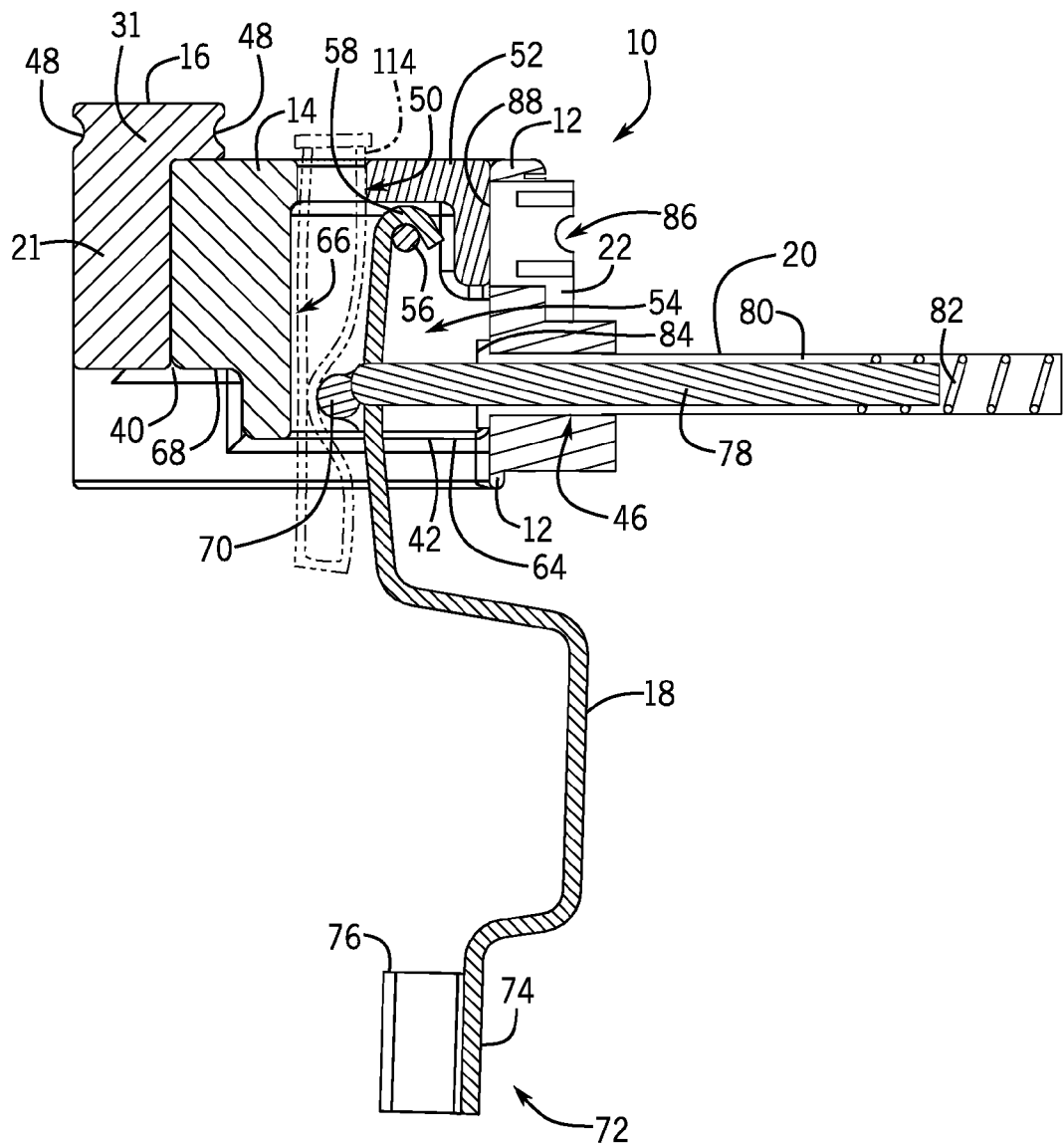
FIG. 3 is a sectional view of the exemplary embodiment of the pinch valve as taken along line 3-3 of FIG. 1.

FIG. 3 is a cut away view of the pinch valve 10 as taken along line 3-3 of FIG. 1. The view of FIG. 3 further depicts the arrangement of the components within the valve block 12. FIG. 3 thus depicts the valve gate 16 and valve insert 14 secured within an interior 30 of the valve block 12. The valve gate 16 and valve insert 14 both engage the upper ridge 40, while the valve insert 14 further engages the lower ridge 42.

Figure 7:
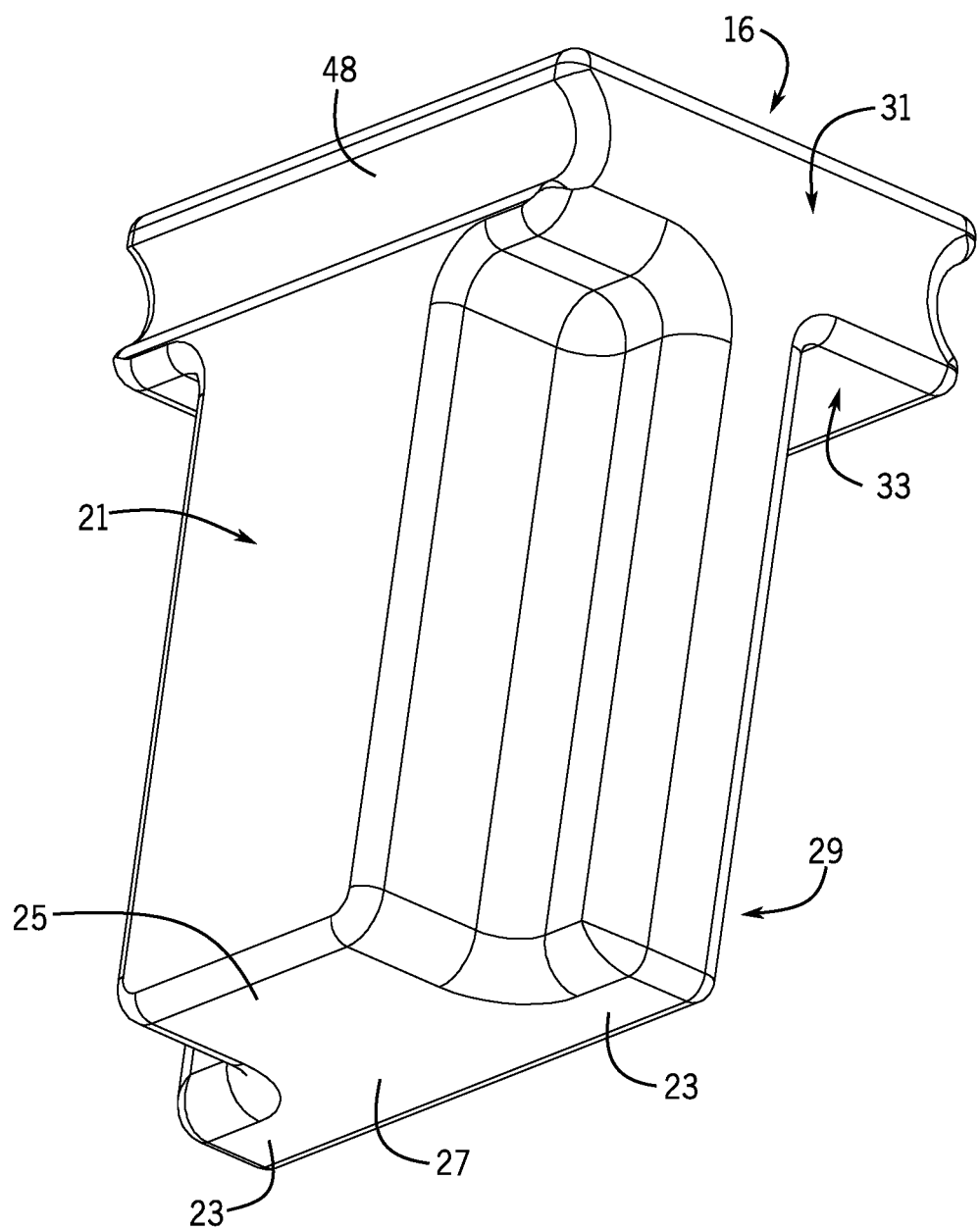
FIG. 7 is a perspective view of an exemplary embodiment of a valve gate.

In an embodiment, the valve insert 14 is at least partially held in a secure position within the valve block 12 by a friction fit with the valve gate 16. The valve gate 16 exemplarily includes grip detents 48. In other embodiments, the grip detents 48 need not be included. Friction fit of the components of the inch valve 10 facilitates assembly and disassembly of the pinch valve 10 exemplarily for cleaning or maintenance. The valve gate 16 is depicted and described in further detail herein with respect to FIG. 7. An additional embodiment of the valve gate 16 is described with respect to FIGS. 12-14. The valve gate 16 includes a generally "T" shaped body 21 when viewed in a vertical dimension from the bottom 27 of the valve gate 16. The body 21 includes opposed side projections 23 which extend from a center portion 25. The body 21 is also generally "T" shaped when viewed in a depth dimension from either of the side projections 23. A top portion 31 exemplarily extends in a plane in the width and depth dimensions and orthogonal to the side projections 23. The top portion 31 further forms a generally "T" shape when viewed in the width dimension from the venter portion 25, the top portion 31 being exemplarily orthogonal to the center portion 25. The top portion 31 exemplarily includes the aforementioned grip detents 48. The center portion 25 exemplarily fits within the vertical slot 38 of the valve block 12. The side projections 23 also engage the valve block. In an embodiment, at least a portion of the bottom 27 of the valve block 16 engages the upper ridge 40. Exemplarily, a back side 29 of the valve gate 16 and a lower surface 33 of the top portion 21 of the valve gate 16 are adapted to engage the valve insert 14 with a friction fit, to secure the valve insert 14 within the valve block 12.

Figure 6:
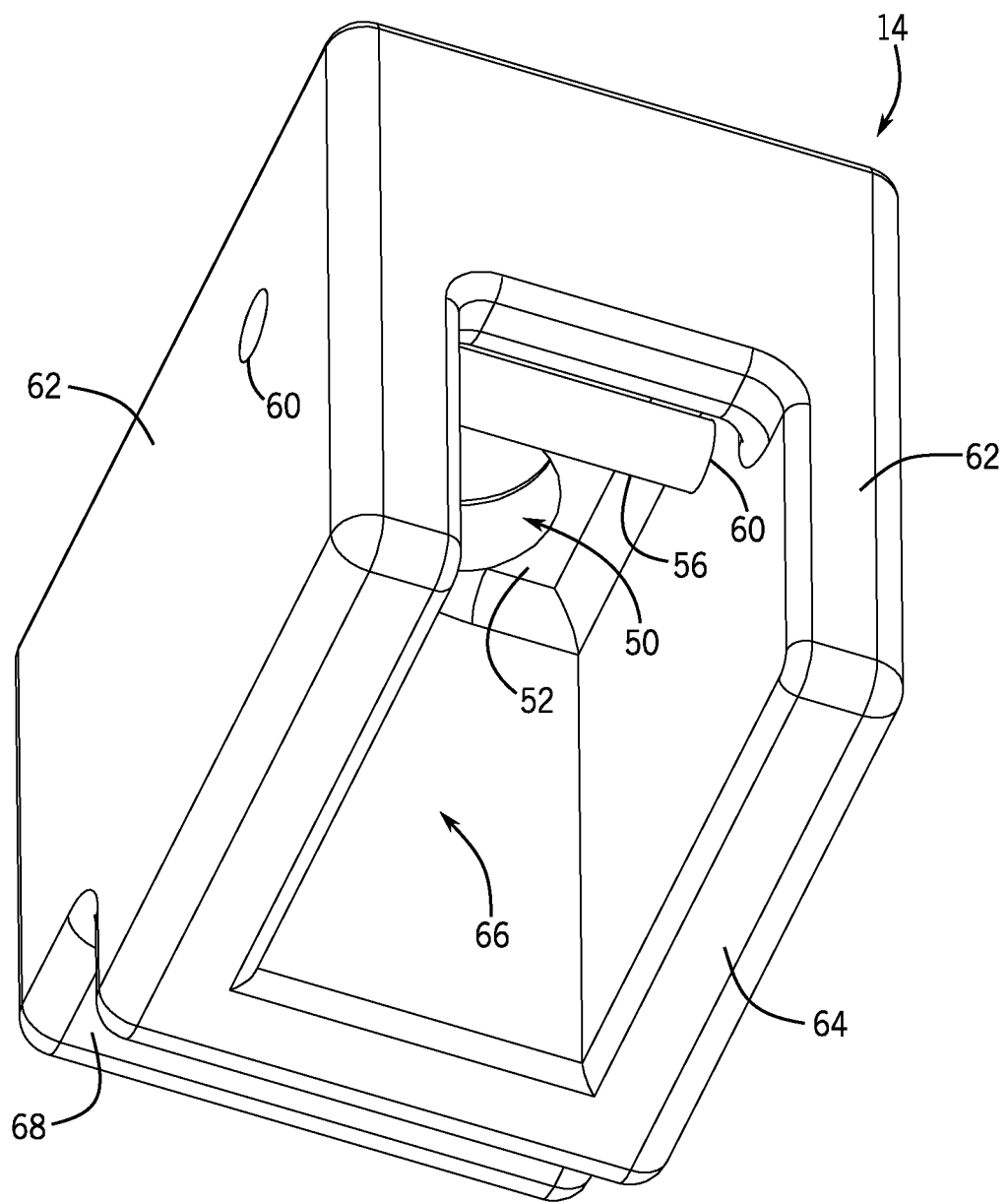
FIG. 6 is a bottom perspective view of an exemplary embodiment of a valve insert.

The valve insert 14, which is also depicted in further detail in FIG. 6, is exemplarily constructed of stainless steel or aluminum and is exemplarily thermally conductible. The valve insert 14 includes a tube opening 50 through a top 52 of the valve insert 14. An exemplarily embodiment of a flexible tube 114 is shown in dashed lines in FIG. 3. In an embodiment, the flexible tube extends through the tube opening 50 and a lever chamber 54 of the valve insert 14 and extends out through the bottom of the valve insert 14 and the valve block 12. The tube opening 50 may be dimensioned to be similar to that of an outside diameter of the flexible tube 114. In another embodiment, the tube opening engages the flexible tube 114 for thermal condition as described herein.

The lever 18 is pivotably secured within the lever chamber 54 by pivotable engagement between a pivot pin 56 and a hook 58 of the lever 18. As best seen in FIG. 6, the pivot pin 56 extends between pin holes 60 in the sides 62 of the valve insert 14. As further seen in FIG. 6, bottom surface 64 of the valve insert 14 is generally U-shaped such as both facilitate engagement of the bottom surface 64 of the valve insert 14 with the lower ridges 42 of the valve block 12 but also to provide an extension of the tube anvil 66 as will be described in further detail herein. A bottom ledge 68 of the valve insert 14 further engages the upper ridges 40 of the valve block 12, in embodiments that include an upper ridge 40 in the valve block 12.

The flexible tube 114 extends through the valve insert 14 and one side of the flexible tube 114 contacts the tube anvil 66 of the valve insert. Due to the aforementioned metal construction of the valve insert 14 and engagement with heat sink 22, as will be described in further detail herein, the valve insert 14, and particularly the tube anvil 66 of the valve insert 14 can be cooled such that the flexible tube 114, and any liquid held within the flexible tube 114 can be cooled by contact with the valve insert 14. Additionally, the cooled temperature of the valve insert 14 will also cool the lever chamber 54 generally.

The heat sink insert 22, as described above, is exemplarily constructed of aluminum and extends partially into the valve block 12 through the heat sink aperture 44. The heat sink insert 22 includes a channel 86 which is exemplarily dimensioned to contact the refrigerant tube 126 of the liquid dispenser in a thermal transferring engagement. The channel 86 is exemplarily a semi-circle or another shape for mating engagement with the refrigerant tube 126. In other embodiments, the refrigerant tube 126 may be another shape, for example rectangular or triangular. The heat sink insert 22 further includes an engagement 88 that is exemplarily flush with the interior side of the back wall 36 of that valve block 12. The engagement face 88 creates a thermal transferring engagement with the valve insert 14. While depicted in FIG. 3 as being a flat surface, flush with the interior side of the back wall 36, it will be recognized that in alternative embodiments, the engagement face 88 may include features, for example projections, ribs, or slots (not depicted) that matingly engage similar opposed features (not depicted) on the valve insert 14. Such features may operate to facilitate connection of the heat sink insert 22 to the valve insert 14.

As previously described, during operation, the refrigerant tube 128 of the refrigeration system of the liquid dispenser cools the heat sink insert 22 which is also in contact and thermal engagement with the valve insert 14. Cooling of the valve insert 14 and particularly cools the tube anvil 66. Engagement of the flexible tube 114 with the tube anvil 66 and location of the flexible tube 114 within the refrigerated tube chamber 54 cools the flexible tube 114. This helps to maintain refrigeration of any liquid located within the flexible tube 14 above the tube projection 70 of the lever 18 after the flexible tube 114 exits the refrigerated compartment 110. In exemplary embodiments, the valve block 12 and the valve gate 16 may be constructed of a plastic such as HDPE which provides installation around the cooled components of the valve insert 14 and the heat sink insert 22.

The flexible tube 114 exemplarily provides a full port inlet to the punch valve, while embodiments described herein operate to provide a full round, single pinch closure of the flexible tube 114 against the tube anvil 66. The lever 18 includes a tube projection 70 which engages the flexible tube 114. In an open position, the tube projection 70 on the lever is moved away from the tube anvil 66 and the flexible tube 114 is adapted in an unobstructed, open condition permitting the flow of fluid therethrough. In a closed position, the tube projection 70, as will be described in further detail herein, is moved towards the tube anvil 166 and crushes or otherwise deforms the flexible tube 114 to pinch and occlude the flexible tube 114 closing the flexible tube 114 from dispense of liquid therethrough.

A pin plunger 20 extends at least partially through the valve block 12 and engages the lever, exemplarily within the lever chamber 54. The pin plunger 20 biases the lever 18 in a normally closed position with the tube projection 70 engaging the flexible tube 114 against the tube anvil 66. In exemplary and non-limiting embodiments, the pin plunger 20 may provide a biasing force of eight pounds or ten pounds. In operation, a user applies a force to a bottom end 72 of the lever 18. This pivots the lever 18 about the pivot pin 56, overcoming the biasing force of the pin plunger 20 against the lever to move the lever 18, and particularly the tube projection 70 to the open position wherein the flexible tube 114 is open and liquid may be dispensed therethrough exemplarily by a gravity feed from the liquid containers held within the liquid dispenser.

The pin plunger 20 applies a biasing force against the lever 18. The biasing force of the pin plunger 20 biases the lever 18 into the closed condition, pinching the flexible tube 114 closed against the tube anvil 166. The biasing force of the pin plunger is overcome by a manual force applied against the bottom end 72 of the lever 18 to move the lever 18 and tube projections 70 into an open position to open the flexible tube 114 to dispense a liquid. In the exemplary embodiment of the pin plunger 20 depicted herein, the pin plunger 20 includes a pin 78 which translates within a casing 80. A spring 82 is disposed within the casing 80 applies the biasing force to the pin 78 which engages the lever 18 and translate the biasing force to the lever 18. As previously described, the pin plunger 20 at least partially extends through the plunger hole 46 of the valve block 12. The casing 80 is exemplarily dimensioned to engage the valve block 12 within plunger hole 46 with a friction fit to retain the pin plunger 20 therein. The casing 80 further includes a flange 84 that extends radially outward from the casing 80. The flange 84 further engages the interior side of the back wall 36 of the valve block 12 to retain the pin plunger 20 within the valve block 12. The pin plunger 20 further extends beyond the valve block 12 and upon installation into the liquid dispenser is inserted into the plunger hole 128 of the liquid dispenser 100.

Manual operation of the pinch valve 10 may exemplarily occur in two different ways with the embodiment of the lever 18 as depicted herein. In a first operation, a user may press a cup or other receptacle against the lower portion 72 of the lever 18, particularly in a central region 74 of the lever 18. The central region 74 may be exemplarily embodied as a horizontal bar secured to a downwardly depending shaft 75 of the lever 18. Thus, the central region 74 and the shaft 75 may give the lever 18 an overall appearance of an inverted "T" shape. In a second manner of operation, one or more tabs 76 may extend exemplarily, but not exclusively, forward and outward from the central region 74. A user may place a force against the tabs 76, exemplarily with one hand while holding the receptacle such as a cup below the flexible tube 114 with another hand or by placing the cup in a dispensing area 120 of the liquid dispenser 100.

FIG. 10 is a perspective view of an additional exemplary embodiment of a pinch valve 210. FIG. 11 is an exploded view of the additional exemplary embodiment of a pinch valve 210. It will be recognized that in the embodiment depicted in FIGS. 10 and 11, that similar structures between the embodiments previously described and the embodiment depicted in FIGS. 10 and 11 and having similar corresponding 200 level numbers. In the embodiment of the pinch valve 210, the valve block 212, the valve insert 214, and the valve gate 216 all exhibit differences from those components as described above.

The valve block 212 exemplarily opens to the front and does not include a front wall. Additionally, the valve block 212 includes a single ridge 240 that supports the valve insert 214. The ridges 240 are exemplarily wider in dimension, exemplarily to match a width of the side 262 of the valve insert 214.

Overall, the size of the valve insert 214 is generally increased and the valve insert 214 is integrally constructed with the heat sink insert 222. The combination of these features both improves the thermal conductivity between the valve insert 241 and the heat sink insert 222 (and to the refrigeration system via the heat sink insert 222). The increased width of the sides 262 of the valve insert 214 reduces a width of the tube chamber 254 defined within the valve insert 214, and in further combination with the valve gate 216. In the exemplary embodiment, the valve insert 214 further defines the front side 234 of the pinch valve 210 and includes both a vertical slot 217 and opposed side slot 215 configured to receive the valve gate 216.

In an exemplary embodiment, the valve gate 216 forms the front wall of the tube chamber 254 and provides the tube anvil 266 against with the tube projection 270 pinches the flexible tube (not depicted). The valve gates 216 further includes a tube cut out 250, which may exemplarily extend into the tube anvil 266 and it configures to help to properly locate an define a position for the flexible tube within the pinch valve 210.

In operation, the increased mass the combined valve insert 214 and heat sink insert 222 as well as the reduction of the size of the tube chamber 254 improves the refrigeration efficiency of the pinch valve about the flexible tube. Additionally, the valve insert 214 operates to retain the valve gate 216 rather than the valve gate retaining the valve insert within the valve block as described in earlier embodiments. It will be recognized that in embodiments, the valve gate 216 may be additionally constructed of a thermally conductive material, including, but not limited to stainless steel or aluminum.

Figure 12:
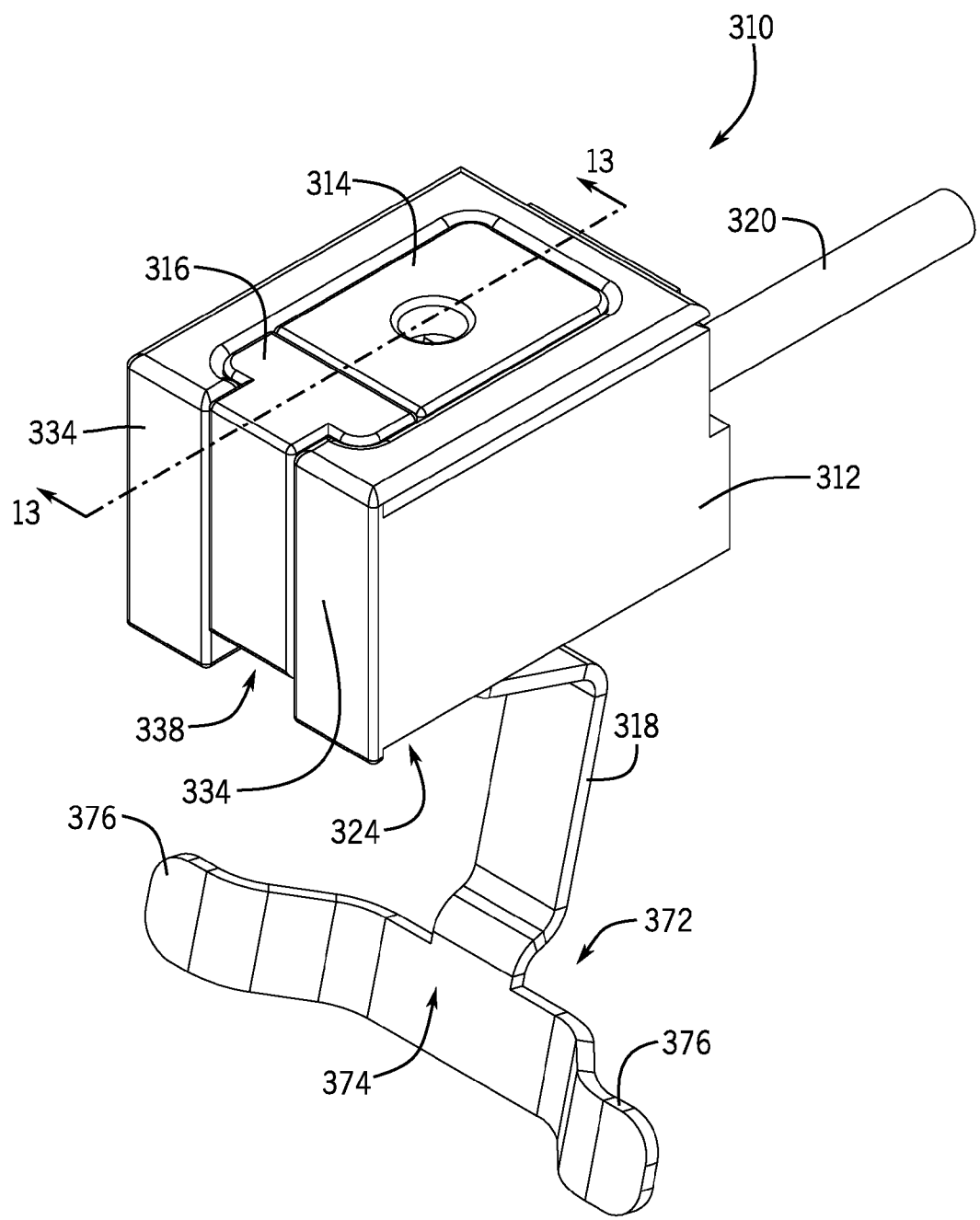
FIG. 12 is a perspective view of a further exemplary embodiment of a pinch valve.
Figure 13:
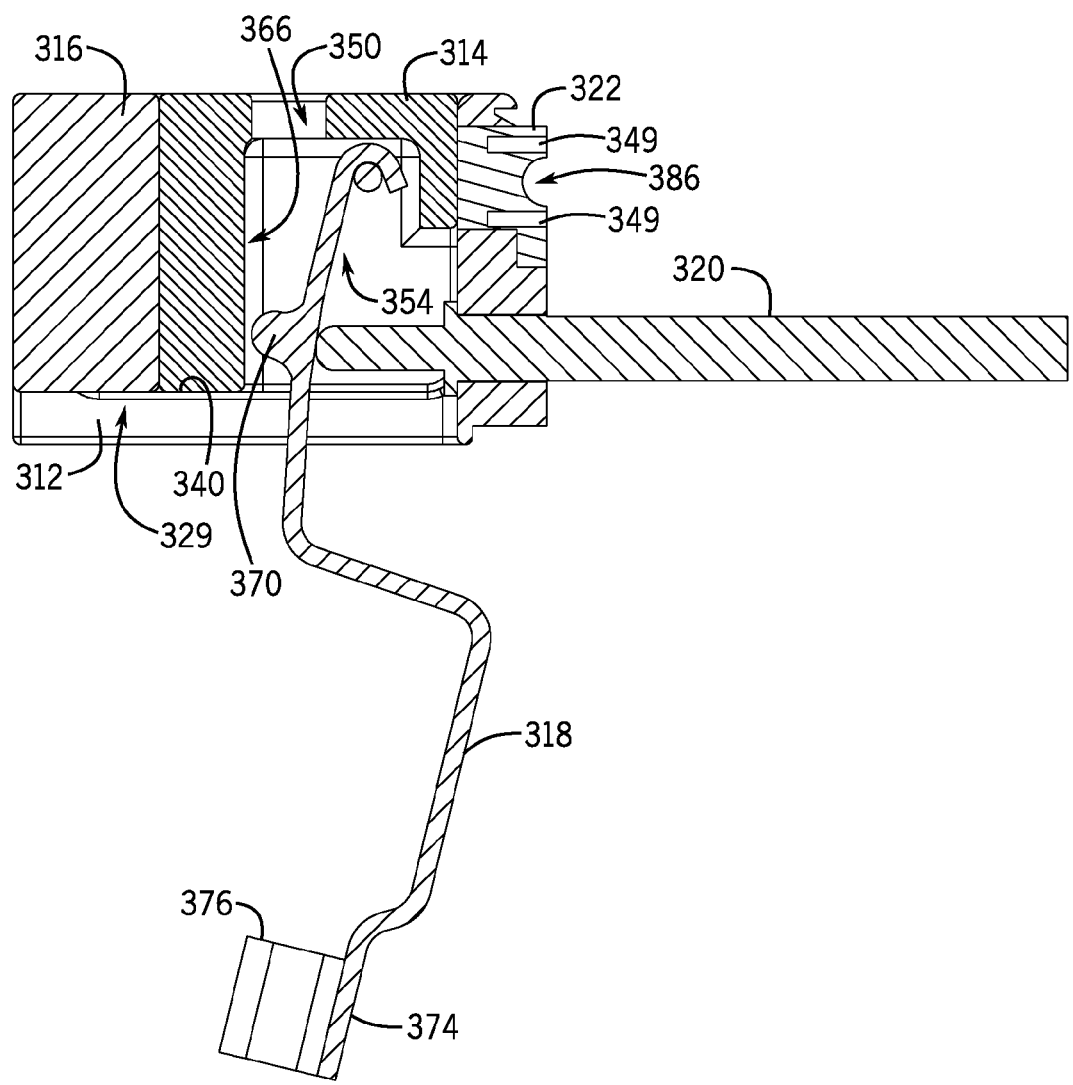
FIG. 13 is a sectional view taken along line 13-13 of FIG. 12.
Figure 14:
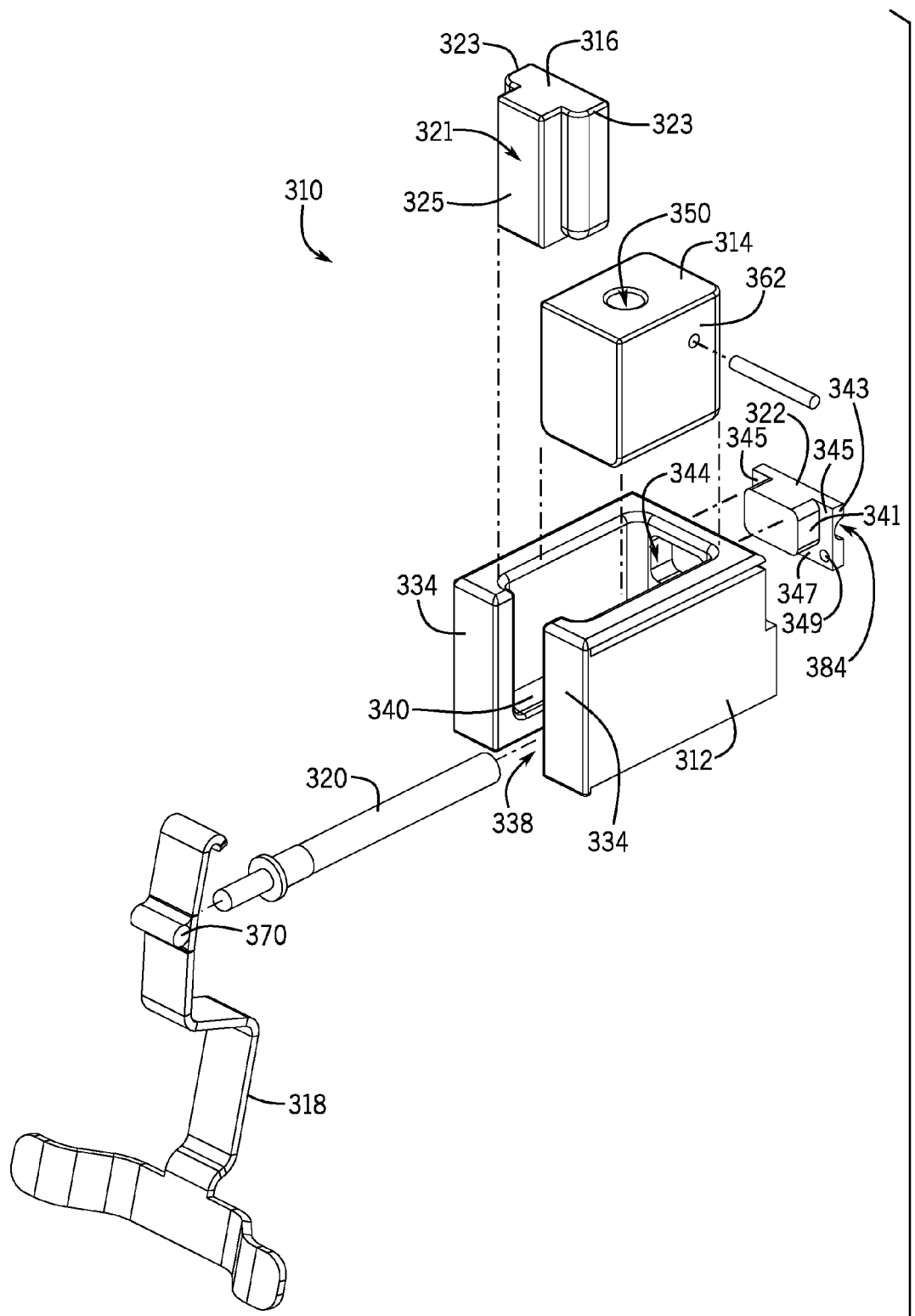
FIG. 14 is an exploded view of the exemplary embodiment of a pinch valve depicted in FIG. 12.

FIGS. 12-14 depcit a still further exemplary embodiment of a pinch valve 310. FIG. 12 is a perspective view of the pinch valve 310. FIG. 13 is a sectional view of the pinch valve 310 taken along line 13-13 of FIG. 12. FIG. 14 is an exploded view of the pinch valve 310. The described provided herein is with respect to all three of these Figures and it will be recognized that similar reference numbers are 300 reference number are used herein previously described.

The pinch valve 310 includes similar features to those as previously described with respect to other embodiments above, although in s still further combination. The valve block 312 includes a flat interior ridge 340 that is dimensioned to respond to a width of the side walls 362 of the valve insert 314. The interior ridges 340 support the valve insert 314 within the valve block 312. A valve gate 316 is further inserted into the interior of the valve block 312. The valve gate 316 includes a center projection 352 that fits in a keyed relationship within a vertical slot 338 within the valve block 312. Side projections 323 of the valve gate 316 engage interior surfaces of the front wall 334 of the valve block 312. A lower surface 329 at the side projection 323 of the valve gate 316 engage the interior ridges 340 that support the valve gate 316 within the valve block 312. Valve gate 316 serves to create a friction fit to secure the valve insert 314 (as well as the valve gate 316) within the interior of the valve block 312. In exemplary embodiments, the valve gate 316 does not include a top portion and instead, the top surfaces of the valve gate 316, valve insert 314, and valve block 312 are all flush.

The friction fit of the valve gate 316 and valve insert 314 within the valve block 312 hold the valve insert 314 in a thermally conductive engagement with the heat sink insert 322. The heat sink insert 322 includes a heat sink projection 341 that extends through a hole 344 through the rear of the valve block 312. The heat sink insert 322 further includes an outer face 343 that includes an engagement lip which exemplarily may be embodied by side lips 345 and bottom lip 347. The engagement lips (345, 347), contact the outer surface of the valve block 312 and create a larger surface area for thermal contact between the heat sink and the refrigeration tube (not depicted) of a liquid dispenser in which the pinch valve is stalled. The heat sink insert 322 may further include holes 349 to receive screws, exemplarily to secure the heat sink insert 322 to the valve body 312.

As discussed above, embodiments of the pinch valve as disclosed herein achieve improved valve closure by biasing the lever in a normally closed position with the pin plunger. Additionally, the pinch valve is constructed of a relatively small number of parts that fit together predominantly by friction fit which facilitates assembly and disassembly while also prompting cleanliness by minimizing and simplify surfaces that must be cleaned. Furthermore, embodiments of the pinch valve provide greater thermal treatment to the flexible tube along the entire length of the flexible tube within which liquid is held when the flexible tube is occluded by the pinch valve.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A pinch valve comprising:
a valve block having a plurality of walls defining an open interior;
a valve insert having a plurality of walls defining a tube chamber, the valve insert disposed within the open interior of the valve block;
a valve gate having a body, the body movably engaged with the valve insert, the valve gate at least partially disposed within the open interior of the valve block; and
a lever pivotably connected to the valve insert, the lever comprising a tube projection pivotably movable within the tube chamber.

2. The pinch valve of claim 1, further comprising a heat sink insert, partially disposed through a wall of the plurality of walls of the valve block and extending exterior of the valve block.

3. The pinch valve of claim 2, wherein the heat sink insert is integrally formed with the valve insert.

4. The pinch valve of claim 2, wherein the valve insert is held in thermally conductive engagement with the heat sink insert.

5. The pinch valve of claim 4, wherein the valve insert comprises a tube anvil opposed from the tube projection.

6. The pinch valve of claim 5, wherein the tube projection is configured to pinch a flexible tube against the tube anvil to occlude the flexible tube.

7. The pinch valve of claim 4, wherein the valve insert is held in thermally conductive engagement with the heat sink insert by a friction fit caused by the valve gate positioned in engagement with the valve block and the valve insert.

8. The pinch valve of claim 2, wherein the heat sink insert and the valve insert are constructed of thermally conductive material.

9. The pinch valve of claim 1, wherein the valve insert and the valve gate are held at least partially within the valve block by a friction fit.

10. The pinch valve of claim 9, wherein the valve block comprises internal ridges which engage and support the valve insert and the valve gate.

11. The pinch valve of claim 9, wherein the valve block comprises a vertical slot defined in a front wall of the valve block and a center portion of the valve gate is received within the vertical slot.

12. The pinch valve of claim 1, further comprising a pin plunger that extends at least partially through a wall of the plurality of walls of the valve block into the tube chamber, the pin plunger engages the lever and biases the lever and tube projection in a direction towards the valve gate.

13. The pinch valve of claim 1, wherein the valve gate comprises the tube anvil and the valve gate is received within the valve insert.

14. The pinch valve of claim 13, wherein the valve insert comprises a vertical slot and a center portion of the valve gate is received within the vertical slot of the valve insert.

15. A liquid dispenser comprising:
a cabinet;
a valve block having a plurality of walls defining an open interior;
a valve insert having a plurality of walls defining a tube chamber, the valve insert disposed within the open interior of the valve block;

a valve gate having a body, the body movably engaged with the valve insert, the valve gate at least partially disposed within the open interior of the valve block; and a lever pivotably connected to the valve insert, the lever comprising a tube projection pivotably movable within the tube chamber.

16. The liquid dispenser of claim 15, further comprising:

a heat sink insert, partially disposed through a wall of the plurality of walls of the valve block and extending exterior of the valve block;

a refrigeration system that operates to cool the cabinet; and a refrigerant line that extends from the refrigeration system and engages the heat sink insert.

17. The liquid dispenser of claim 16, wherein the heat sink insert engages the refrigerant line in a mating and thermally conductive engagement, and the heat sink engages the valve insert in a thermally conductive engagement.

18. The liquid dispenser of claim 16, wherein the valve insert and the heat sink insert are a unitary structure.

19. The liquid dispenser of claim 16, further comprising:

a container disposed within the cabinet; and a flexible tube, partially disposed within the cabinet, the tube extending out of the cabinet and through the pinch valve;

wherein the pinch valve includes a tube anvil and the lever operates between a closed position wherein the flexible tube is occluded between the tube projection and the tube anvil and an open position, wherein the tube projection is positioned away from the tube anvil and liquid is permitted to flow through the flexible tube.

20. The liquid dispenser of claim 19, wherein the valve insert comprises the tube anvil and a tube opening and the flexible tube is received through the tube opening and against the tube anvil, wherein the valve insert cools the flexible tube.

* * * * *